US009267444B2

(12) United States Patent
Voigtlaender et al.

(10) Patent No.: US 9,267,444 B2
(45) Date of Patent: Feb. 23, 2016

(54) SEALING ARRANGEMENT FOR A CONTROL DEVICE OF AN INTERNAL COMBUSTION ENGINE

(75) Inventors: Karsten Voigtlaender, Duesseldorf (DE); Carsten Dickmann, Wuppertal (DE); Elina Sovva, Duesseldorf (DE)

(73) Assignee: PIERBURG GMBH, Neuss (DE)

( * ) Notice: Subject to any disclaimer, the term of this patent is extended or adjusted under 35 U.S.C. 154(b) by 826 days.

(21) Appl. No.: 13/521,057

(22) PCT Filed: Dec. 17, 2010

(86) PCT No.: PCT/EP2010/070056
§ 371 (c)(1),
(2), (4) Date: Aug. 16, 2012

(87) PCT Pub. No.: WO2011/091909
PCT Pub. Date: Aug. 4, 2011

(65) Prior Publication Data
US 2013/0001882 A1    Jan. 3, 2013

(30) Foreign Application Priority Data
Jan. 27, 2010    (DE) .......................... 10 2010 006 023

(51) Int. Cl.
*F16K 1/226* (2006.01)
*F02D 9/10* (2006.01)
*F02M 25/07* (2006.01)
(Continued)

(52) U.S. Cl.
CPC ........... *F02D 9/106* (2013.01); *F02M 25/0793* (2013.01); *F16K 1/2268* (2013.01); *F16K 41/026* (2013.01); *F02D 9/04* (2013.01); *Y02T 10/121* (2013.01)

(58) Field of Classification Search
CPC ......... F02D 9/106; F02D 9/04; F16K 41/026; F16K 1/2268; F16K 41/02; F16K 41/023; F02M 25/0793; Y02T 10/121

USPC .......................................... 251/214, 305–308
See application file for complete search history.

(56) References Cited

U.S. PATENT DOCUMENTS 2,657,005 A     10/1953  van Nest
3,988,000 A *   10/1976  Reese ........................... 251/214
(Continued)

FOREIGN PATENT DOCUMENTS

CN    1185195 A    6/1998
CN    1759265 A    4/2006
(Continued)

OTHER PUBLICATIONS

English Translation of WO 2008/058779 A1, Tonnesman et al., May 2008.*

(Continued)

*Primary Examiner* — John Bastianelli
(74) *Attorney, Agent, or Firm* — Norman B. Thot

(57) ABSTRACT

A sealing arrangement for a control device of an internal combustion engine includes a housing. A channel is formed in the housing. The channel has a gas flow therethrough. A control member controls a flow of the gas in the channel. The control member is arranged on a shaft. A bearing supports the shaft in a bearing bore of the housing. A vent bore extends in the housing from an inner wall of the channel on an inlet side of the control member to a rear side, facing outward from the channel, of the bearing arranged in the housing, and into the bearing bore. A first groove is formed in the shaft behind the bearing. The first groove is configured so as to be circumferential when seen from the channel. The first groove is surrounded radially by a sealing device which is configured to cooperate with the first groove.

17 Claims, 2 Drawing Sheets

(51) Int. Cl.
*F16K 41/02* (2006.01)
*F02D 9/04* (2006.01)

(56) References Cited

U.S. PATENT DOCUMENTS

| | | | |
|---|---|---|---|
| 4,406,441 A * | 9/1983 | Lukesch et al. | 251/214 |
| 5,445,248 A | 8/1995 | Clarke et al. | |
| 5,531,205 A | 7/1996 | Cook et al. | |
| 2002/0134960 A1 * | 9/2002 | Zwick | 251/214 |
| 2006/0027210 A1 | 2/2006 | Hannewald et al. | |
| 2007/0245561 A1 | 10/2007 | Miyauchi et al. | |

FOREIGN PATENT DOCUMENTS

| | | |
|---|---|---|
| DE | 101 44 293 A1 | 4/2003 |
| DE | 10 2006 054 041 B3 | 5/2008 |
| JP | 55 006 062 S | 1/1980 |
| JP | 2005 180 423 A | 7/2005 |
| WO | WO 2008/058779 A1 * | 5/2008 |
| WO | WO 2009/142575 A1 | 11/2009 |

OTHER PUBLICATIONS

K. Trutnovsky et al.: „ Berührungsfreie Dichtungen, VDI-Verlag, 4. überarbeitete und erweiterte Auflage, vol. 4, Partial English Translation, pp. 186-193 (1981).

K. Trutnovsky: „Berührungsdichtungen an ruhenden und bewegten Maschinenteilen, Springer-Verlag, Partial English Translation, p. 159 (1958).

* cited by examiner

US 9,267,444 B2

SEALING ARRANGEMENT FOR A CONTROL DEVICE OF AN INTERNAL COMBUSTION ENGINE

CROSS REFERENCE TO PRIOR APPLICATIONS

This application is a U.S. National Phase application under 35 U.S.C. §371 of International Application No. PCT/EP2010/070056, filed on Dec. 17, 2010 and which claims benefit to German Patent Application No. 10 2010 006 023.2, filed on Jan. 27, 2010. The International Application was published in German on Aug. 4, 2011 as WO 2011/091909 A1 under PCT Article 21(2).

FIELD

The present invention relates to a sealing arrangement for a control device of an internal combustion engine, comprising a housing, a channel arranged in the housing and through which gas flows, a control member by which a gas flow in the channel can be controlled, a shaft on which the control member is arranged, bearings by means of which the shaft is supported in bearing bores in the housing, and a vent bore extending in the housing from an inner wall of the channel on an inlet side of the control member to a rear side, facing out from the channel, of the bearings arranged in the housing, and into the bearing bore.

BACKGROUND

Such sealing arrangements are used, for example, in control devices, such as exhaust gas recirculation flap valves, for controlling a recirculated exhaust gas flow in commercial vehicles, where large quantities of exhaust gas must be supplied to the engine in a precisely controlled manner. It is necessary here to prevent the intrusion of exhaust gas into the bearings and, further, to prevent the gas from flowing through the bearing bore out into the atmosphere.

DE 10 2006 054 041 B3 discloses an exhaust gas control device comprising a housing in which an exhaust gas recirculation channel is formed that is controlled by a flap. This flap is driven by an electric motor via a transmission unit and is arranged for rotation on a shaft that is supported in bearing bores formed in the housing defining the channel. In order to prevent the intrusion of exhaust gas, and thus soot, into the bearings, and to simultaneously prevent a leakage gas flow to the outside, the housing is provided with a bore leading from the front side of the flap out from the channel to the rear side of the bearing and into the bearing bore. A sealing flow thus prevails on the rear side of the bearing that leads to a pressure balance with the inside of the channel so that the exhaust gas flow is not drawn into the bearing. To the outside, sealing is provided by means of a sealing disc abutting against a step of the bearing bore. This sealing disc is pressed against the step of the bearing bore by means of a spring via a collar bush and a sliding bush arranged between the collar bush and the sealing disc. The sliding bush serves to reduce friction, whereas a radially directed escape of a leakage flow is supposed to be prevented by the sealing disc and an escape is intended to be realized in the axial direction along the shaft via the axial extension of the collar bush which therefore forms a very narrow and long gap with the shaft.

It has, however, been found that such a design is insufficient with respect to the leakage values. The necessity of precise manufacturing furthermore results in high production costs.

SUMMARY

An aspect of the present invention is to provide a sealing arrangement for a control device with which the leakage values can be further minimized or with which it is possible at least to obtain cost advantages and assembly facilitations, while the leakage values remain the same.

In an embodiment, the present invention provides a sealing arrangement for a control device of an internal combustion engine which includes a housing. A channel is formed in the housing. The channel is configured to have a gas flow therethrough. A control member is configured to control a flow of the gas in the channel. The control member is arranged on a shaft. A bearing is configured to support the shaft in a bearing bore of the housing. A vent bore extends in the housing from an inner wall of the channel on an inlet side of the control member to a rear side, facing outward from the channel, of the bearing arranged in the housing, and into the bearing bore. A first groove is formed in the shaft behind the bearing. The first groove is configured so as to be circumferential when seen from the channel. The first groove is surrounded radially by a sealing device which is configured to cooperate with the first groove.

BRIEF DESCRIPTION OF THE DRAWINGS

The present invention is described in greater detail below on the basis of embodiments and of the drawings in which.

DETAILED DESCRIPTION

Figure 1:
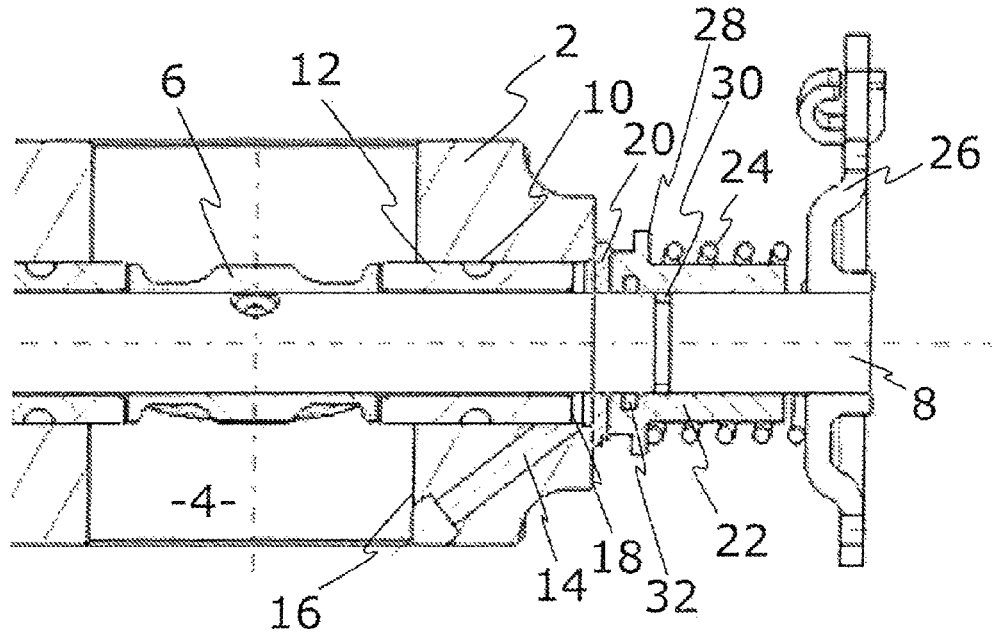
FIG. 1 shows a side elevational view of a sealing arrangement according to the present invention, illustrated in section.

By forming a circumferential groove on the shaft behind the bearing, seen from the channel, which groove is radially surrounded by a sealing means cooperating with the groove, the forming of turbulences in the groove or an improved sealing by the groove is achieved, the groove serving as a labyrinth.

In an embodiment of the present invention, the groove of the shaft can, for example, be arranged radially within a collar bush serving as a further sealing means and being arranged on the shaft. This results in the forming of turbulences in the groove, whereby the resistance against a further flow through the gap between the shaft and the collar bush is increased significantly.

In an embodiment of the present invention, the inner circumference of the collar bushing is provided with a groove. A second opposite turbulence is thereby obtained that again increases the resistance against a flow through the gap and thereby improves the sealing effect.

In an embodiment of the present invention, the groove closer to the bearing has a larger volume than the farther groove. Additional pressure reduction is thereby achieved so that the driving pressure gradient is minimized.

In an embodiment of the present invention, the groove in the collar bush can, for example, be closer to the bearing than the groove in the shaft. The same groove lengths and groove depths can thus be used.

In an embodiment of the present invention, the collar bush can, for example, be biased by a spring against a sliding disc arranged on the shaft, which abuts against the housing from outside. The friction occurring can thus be minimized. At the same time, the sliding disc serves as a sealing against a radially outward directed leakage flow.

In an embodiment of the present invention, a slit metal sealing ring is arranged in the shaft groove which serves as an additional sealing means. This sealing ring, known as a piston ring, can be manufactured at low cost and is simple to assemble. The sealing effect of such a slit metal sealing ring in a groove is very high.

In an embodiment of the present invention, the slit metal sealing ring can, for example, be biased against an inner circumferential wall of the bearing bore, whereby a sealing at the radially outer circumference of the slit metal sealing ring is provided in addition to the sealing of the radially inner portion that is sealed by the cooperation of the sealing ring and the groove.

In an embodiment of the present invention, the slit metal sealing ring is biased to axially abut against a shoulder serving as a stop formed in the bearing bore. This additionally prevents a flow around the outer circumference of the sealing ring since the radially outer portion of the sealing ring abuts against the housing in the axial and the radial direction.

In an embodiment of the present invention, the two ends of the slit metal sealing ring can, for example, abut in the axial direction. A leakage flow through the separating gap of the sealing ring is thereby reliably prevented.

The present sealing arrangement for a control device is characterized by a high degree of tightness. Leakage flows along the shaft are reliably avoided. This leads to a longer lifetime of the bearings and to a reduced soiling of the outer portion. At the same time, such an arrangement can be manufactured and assembled in a cost-effective manner.

Two embodiments of a sealing ring arrangement according to the present invention are illustrated in the Figures and will be described hereunder.

The sealing arrangement for a control device illustrated in FIG. 1 comprises a housing 2 defining a channel 4 in which a flap is arranged for rotation therein, the flap serving as a control member 6 for controlling the mass flow in the channel 4 and being mounted on a shaft 8. The shaft 8 extends from one wall of the housing 2, in which a first bearing bore is arranged, to an opposite wall in which a further bearing bore 10 is arranged, the Figures respectively illustrating only the bearing bore 10 through which the shaft extends outward to a non-illustrated actuator unit.

A bearing 12 is arranged in the bearing bore 10, which bearing surrounds the shaft 8 and by which the shaft 8 is supported in the bearing bore 10. Upstream of the shaft 8, seen in the flow direction, a vent bore 14 is formed that extends from an inner wall 16 of the channel 4 through the housing 2 up to a rear side 18 of the bearing 12 and into the bearing bore 10. The gas present at the rear side 18 acts as a sealing gas. A pressure drop across the bearing 12, i.e., a pressure difference between the channel 4 and the outer portion, is thereby prevented so that the entraining of dirt from the channel 4 into the bearing 12 is reduced, whereby the lifetime of the bearing 12 is extended.

In order to also prevent the sealing gas from escaping to the outside, a sliding disc 20 arranged on the shaft 8 abuts against the housing 2. The sliding disc 20 has an inner diameter that substantially corresponds to the outer diameter of the shaft and an outer diameter that is larger than the diameter of the bearing bore 10 so that the abutment of the sliding disc 20 across the entire diameter of the bearing bore 10 is provided.

On the side of the sliding disc 20 axially opposite the housing 2 and the bearing bore 10, a collar bush 22 is arranged on the shaft 8. This collar bush 22 is pressed by a spring 24 against the sliding disc 20 and thus against the housing 2. For this purpose, the spring 24 is supported on a plate 26 fastened on the shaft 8 and at the end thereof, the plate serving as a lever for adjusting the shaft 8. Correspondingly biased, the spring 24 abuts against the plate 26 by its first end, and its second end abuts against a shoulder 28 formed on the outer diameter of the collar bush 22.

In order to additionally prevent a leakage flow along the shaft 8 between the shaft 8 and the collar bush 22, the inner diameter of the collar bush 22 and the outer diameter of the shaft 8 are formed with a respective groove 30, 32. In FIG. 1, the groove 30 formed in the shaft 8 is closer to the bearing 12 than the groove 32 of the collar bush 22. The collar bush 22 here serves as a sealing means cooperating with the groove 30 since it closes the groove 30 in the radial direction and thereby allows the forming of turbulences in the groove 30. In addition, the volume of the groove 30 is smaller than that of the groove 32. A further pressure reduction is thus achieved.

When a gas flows through the channel 4, there is a risk that this gas escapes outward along the shaft 8 between the bearing 12 and the shaft 8. If high pressure prevails in the channel 4, an outward directed driving pressure gradient exists. Due to the vent bore 14, the same pressure prevails behind the bearing 12 as in the channel so that a flow along the bearing can be reduced significantly.

In addition, however, care should be taken that no gas can escape outward through the vent bore 14 due to the pressure difference prevailing there. Gas flowing along the shaft 8 and into the gap between the collar bush 22 and the shaft 8 will first reach the groove 32. Due to the additional space existing there, a turbulence forms in the groove, whereby a flow resistance is created. The same occurs in the groove 30 disposed therebehind. Due to the fact, however, that this groove 30 has a smaller volume, the pressure is reduced relative to the groove 32 so that the driving pressure gradient is reduced. Because of these measures, the leakage values can be reduced significantly.

Figure 2:
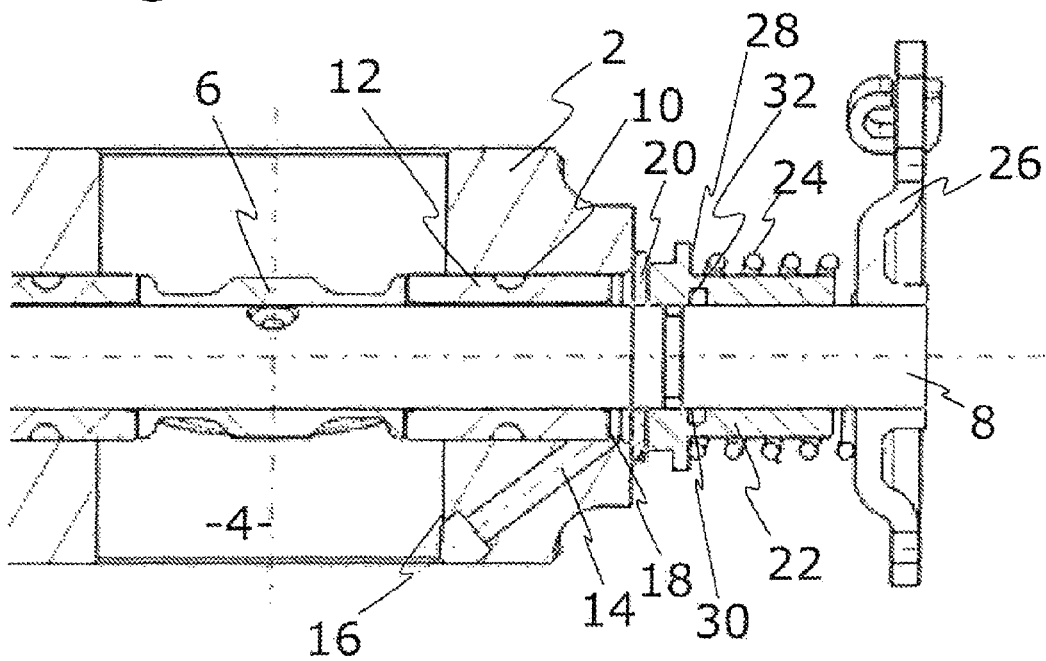
FIG. 2 shows a side elevational view of a slightly modified form of the sealing arrangement of the present invention shown in FIG. 1, illustrated in section.

The embodiment in FIG. 2 differs from that in FIG. 1 only in that the groove 32 of the collar bush 22 is closer to the bearing 12 than the groove 30 in the shaft 8. The functioning is, however, substantially identical to that described with reference to FIG. 1, while it is again possible to make the groove 32 smaller than the groove 30 in the shaft 8 in order to intensify the sealing effect.

Figure 3:
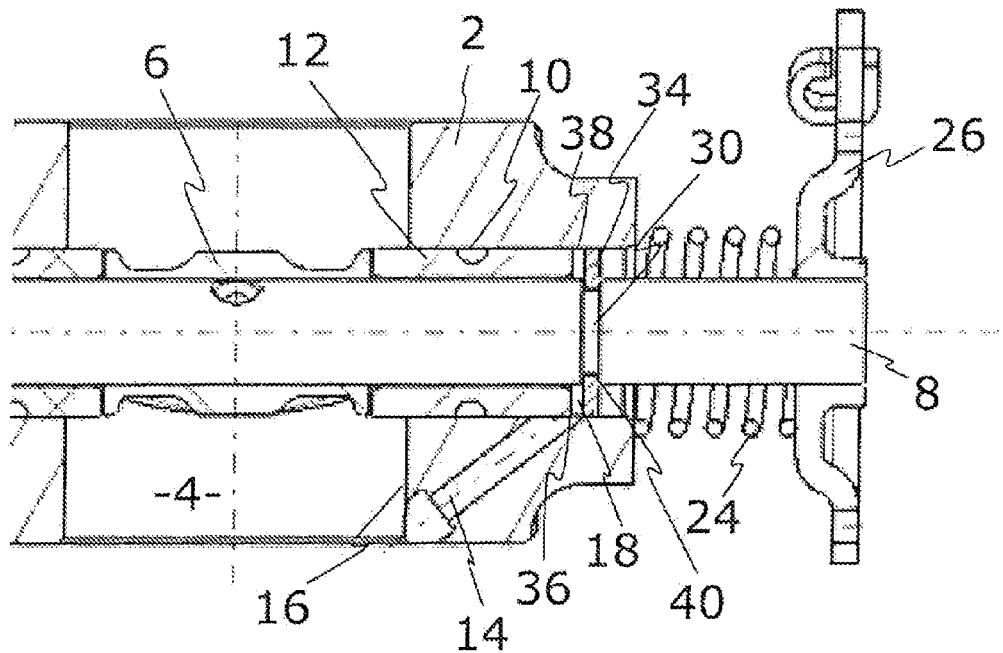
FIG. 3 shows a side elevational view of an alternative sealing arrangement of the present invention, illustrated in section.

In the embodiment of the present invention illustrated in FIG. 3, a slit metal sealing ring 34 is provided in the groove 30 as a sealing means cooperating with the same, the ring being arranged in the groove 30. Seen from the channel 4, the groove is again arranged behind an opening of the vent bore 14 into the bearing bore 10. Contrary to the previously described embodiments illustrated in FIGS. 1 and 2, the groove 30 and the slit metal sealing ring 34 are situated radially inside the bearing bore 10. The outer circumference of the sealing ring 34 is biased to abut against an inner circumferential wall 38 of the bearing bore 10. In the context of the present application, a slit metal sealing ring is a kind of piston ring that has an axial separation plane so that its diameter is slightly variable. The separation plane can, for example, not be strictly axial, but extend obliquely, i.e., under an angle to the center axis, or extend in a step-like manner so that an axially continuous gap is avoided that could serve as a flow gap with little flow resistance. The two ends of the sealing ring 34 accordingly at least abut against each other in the axial direction.

A sealing effect in the groove 30, i.e., at the inner circumference of the sealing ring 34, is produced by the existing pressure difference by which the sealing ring 34 is pressed against the wall 40 axially delimiting the groove 30. In this embodiment, the collar bush can therefore be omitted.

Figure 4:
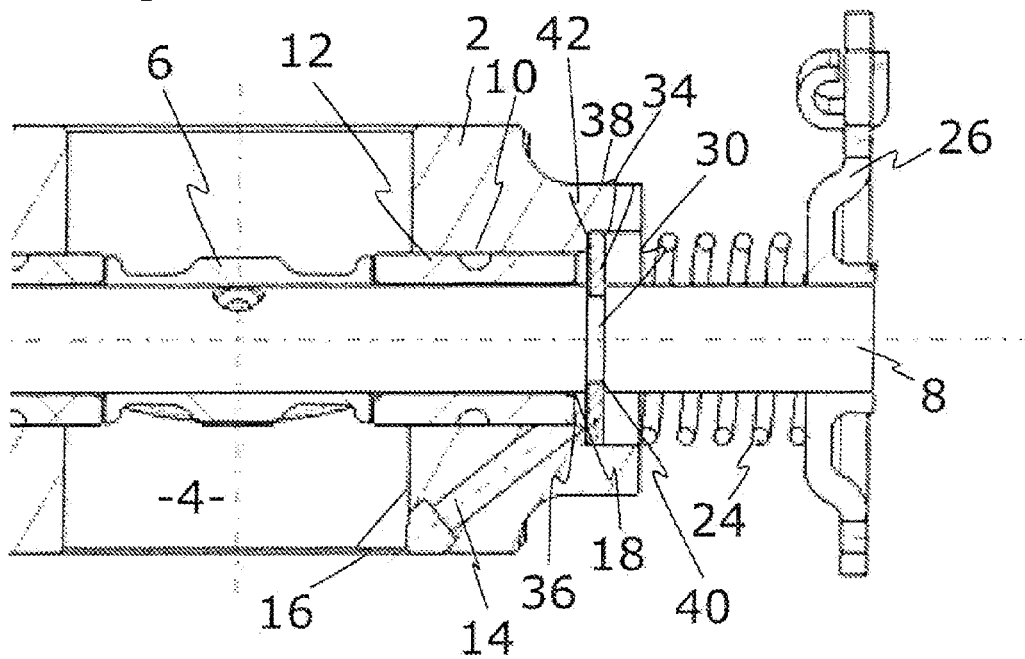
FIG. 4 shows a side elevational view of a slightly modified form of the sealing arrangement of the present invention shown in FIG. 3, illustrated in section.

In FIG. 4, another modification of the embodiment illustrated in FIG. 1 is shown. Here, the sealing ring 34 abuts against a shoulder 42 formed, seen from the channel 4, immediately behind the opening 36 of the vent bore 14 into the bearing bore 10. For a better sealing effect, the sealing ring 34 is pressed against the shoulder 42 by the spring 24 so that a gas flow in the radial direction is prevented by means of the abutment surface of the sealing ring 34. The gas will accordingly not reach the outer circumference of the sealing ring 34.

Sealing arrangements for control devices are thus provided that achieve a good sealing effect both along the shaft and across the circumference of the sealing elements. Clearly better leakage values can thus be achieved, while the control devices remain cost-effective to produce and simple to assemble.

It should be understood that the scope of protection is not limited to the embodiments described herein, but that various structural modifications are conceivable, in particular with respect to the structure of the control device, depending on the application.

What is claimed is:

1. A sealing arrangement for a control device of an internal combustion engine, the sealing arrangement comprising:
    a housing;
    a channel formed in the housing, the channel being configured to have a gas flow therethrough;
    a control member configured to control a flow of the gas in the channel;
    a shaft on which the control member is arranged;
    a bearing configured to support the shaft in a bearing bore of the housing;
    a vent bore extending in the housing from an inner wall of the channel on an inlet side of the control member to a rear side, facing outward from the channel, of the bearing arranged in the housing, and into the bearing bore; and
    a collar bush arranged on the shaft,
    wherein,
    a first groove is formed in the shaft behind the bearing, the first groove being configured so as to be circumferential when seen from the channel, the first groove being surrounded radially by a sealing device which is configured to cooperate with the first groove,
    the first groove in the shaft is arranged radially inside the collar bush,
    a second groove is provided on an inner circumference of the collar bush, and
    the collar bush is configured to serve as the sealing device.

2. The sealing arrangement as recited in claim 1, wherein the first groove and the second groove which is arranged nearer to the bearing has a larger volume than the more remote of the first groove and the second groove.

3. The sealing arrangement as recited in claim 2, wherein the second groove of the collar sleeve is arranged nearer to the bearing than the first groove in the shaft.

4. The sealing arrangement as recited in claim 1, further comprising a sliding disc arranged on the shaft to abut against the housing from outside, and a spring, wherein the spring is configured to bias the collar bush against the sliding disc.

5. The sealing arrangement as recited in claim 1, further comprising a slit metal sealing ring arranged in the first groove in the shaft, wherein the slit metal sealing ring is configured to serve as the sealing device.

6. The sealing arrangement as recited in claim 5, wherein the slit metal sealing ring is configured to be biased against an inner circumferential wall of the bearing bore.

7. The sealing arrangement as recited in claim 6, wherein the slit metal sealing ring is configured to be biased so as to axially abut against a shoulder formed in the bearing bore.

8. The sealing arrangement as recited in claim 7, wherein the slit metal sealing ring comprises two ends, and wherein the two ends of the slit metal sealing ring are configured to axially abut against each other.

9. A sealing arrangement for a control device of an internal combustion engine, the sealing arrangement comprising:
    a housing;
    a channel formed in the housing, the channel being configured to have a gas flow therethrough;
    a control member configured to control a flow of the gas in the channel;
    a shaft on which the control member is arranged;
    a bearing configured to support the shaft in a bearing bore of the housing; and
    a vent bore extending in the housing from an inner wall of the channel on an inlet side of the control member to a rear side, facing outward from the channel, of the bearing arranged in the housing, and into the bearing bore,
    wherein,
    a first groove is formed in the shaft behind the bearing, the first groove being configured so as to be circumferential when seen from the channel, the first groove being surrounded radially by a sealing device which is configured to cooperate with the first groove, and
    a slit metal sealing ring is arranged in the first groove in the shaft, the slit metal sealing ring being configured to serve as the sealing device.

10. The sealing arrangement as recited in claim 9, further comprising a collar bush arranged on the shaft, wherein the first groove in the shaft is arranged radially inside the collar bush, and wherein the collar bush is configured to serve as the sealing device.

11. The sealing arrangement for a control device of an internal combustion engine as recited in claim 10, wherein a second groove is provided on an inner circumference of the collar bush.

12. The sealing arrangement as recited in claim 11, wherein the first groove and the second groove which is arranged nearer to the bearing has a larger volume than the more remote of the first groove and the second groove.

13. The sealing arrangement as recited in claim 12, wherein the second groove of the collar sleeve is arranged nearer to the bearing than the first groove in the shaft.

14. The sealing arrangement as recited in claim 10, further comprising a sliding disc arranged on the shaft to abut against the housing from outside, and a spring, wherein the spring is configured to bias the collar bush against the sliding disc.

15. The sealing arrangement as recited in claim 9, wherein the slit metal sealing ring is configured to be biased against an inner circumferential wall of the bearing bore.

16. The sealing arrangement as recited in claim 15, wherein the slit metal sealing ring is configured to be biased so as to axially abut against a shoulder formed in the bearing bore.

17. The sealing arrangement as recited in claim 16, wherein the slit metal sealing ring comprises two ends, and wherein the two ends of the slit metal sealing ring are configured to axially abut against each other.

* * * * *